May 5, 1959 — D. E. SCHOTT — 2,884,814
TORQUE CONTROLS
Filed Aug. 15, 1955 — 5 Sheets-Sheet 1

INVENTOR
Donald E. Schott
BY
Pennie Edmonds Morton Barrows Taylor
ATTORNEYS

May 5, 1959 D. E. SCHOTT 2,884,814
TORQUE CONTROLS
Filed Aug. 15, 1955 5 Sheets-Sheet 2
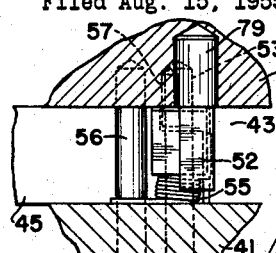
FIG. 8
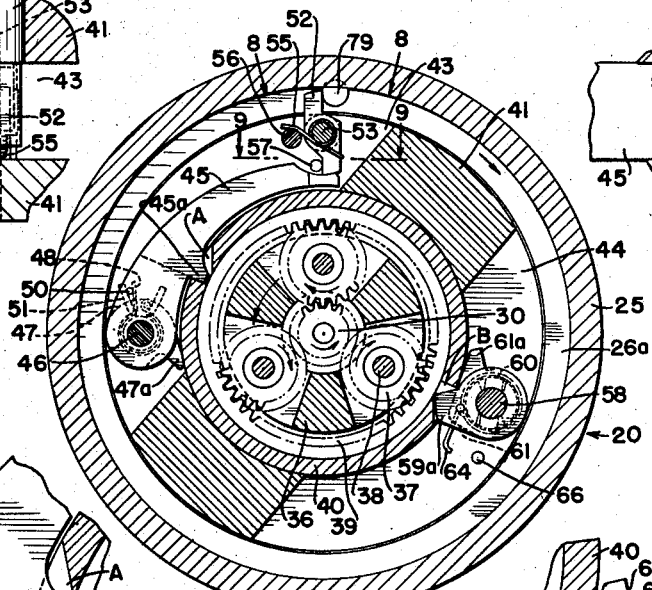
FIG. 4
FIG. 9
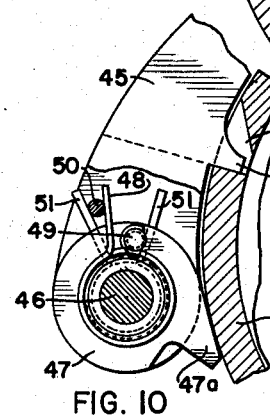
FIG. 10
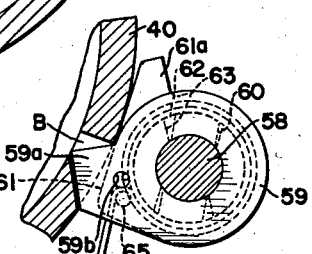
FIG. 12
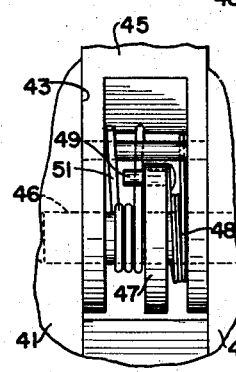
FIG. 11
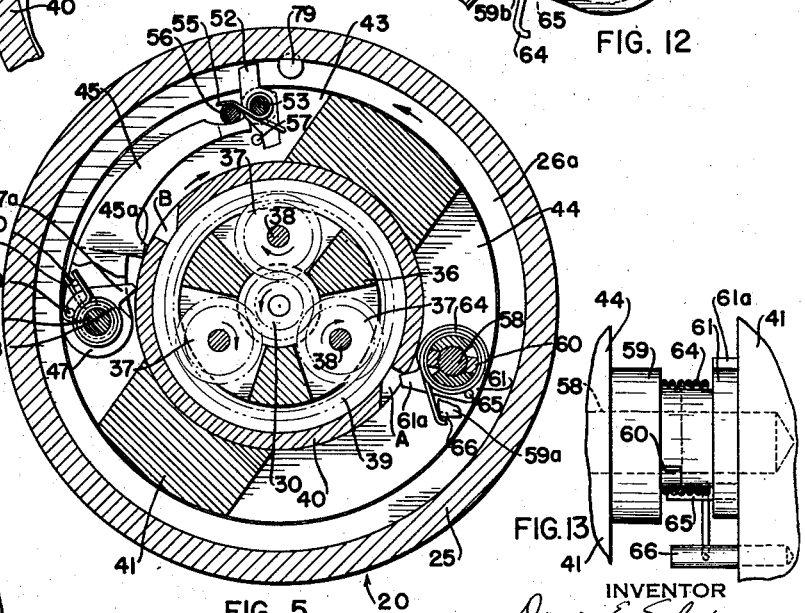
FIG. 5 FIG. 13
INVENTOR
Donald E. Schott
BY
Pennie Edmonds Morton Barrows Taylor
ATTORNEYS May 5, 1959

D. E. SCHOTT 2,884,814

TORQUE CONTROLS

Filed Aug. 15, 1955

INVENTOR
Donald E. Schott
BY
ATTORNEYS

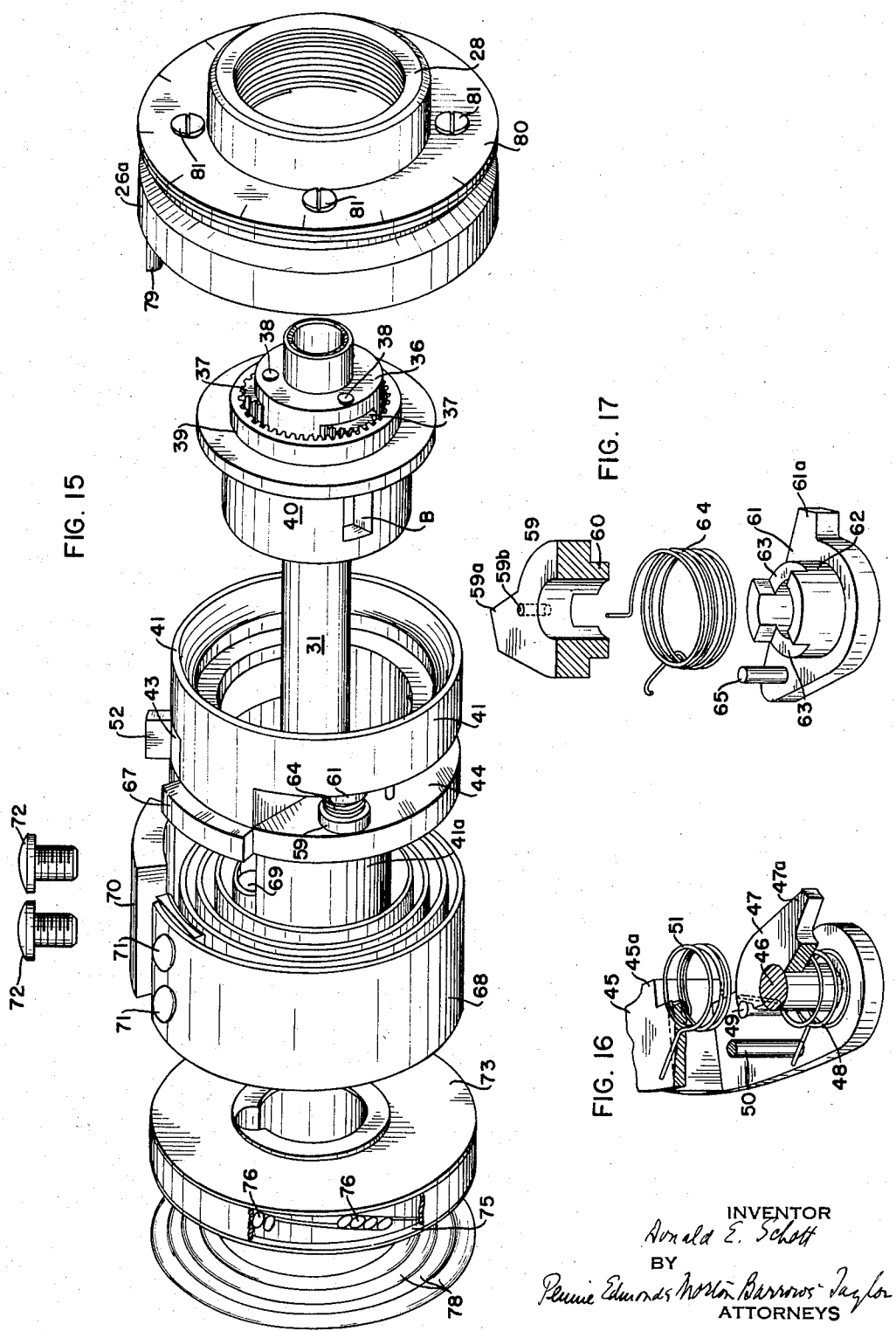

United States Patent Office 2,884,814
Patented May 5, 1959

2,884,814

TORQUE CONTROLS

Donald E. Schott, Flushing, N.Y., assignor to Thomas C. Wilson, Inc., Long Island City, N.Y., a corporation of New York Application August 15, 1955, Serial No. 528,330

17 Claims. (Cl. 74—785)

This invention relates to power transmission devices so constructed that the torque applied through them to a driven member can be prevented from exceeding a selected value. More particularly, the invention is concerned with a novel torque control, which is adjustable for transmission of a maximum torque within a wide range and is wholly mechanical, that is, does not employ electrical or electronic components. The torque control of the invention is simple and compact and it may be employed with prime movers of various types. In one form, it provides a speed reduction between its input and output sides and it may thus be used to especial advantage with compressed air motors, which are of high speed and ordinarily require the use of speed reduction means. The torque control may be employed in many applications and, since all its advantages are realized in its use with an air motor in tube expanding, a form of the control suitable for that purpose will be illustrated and described in detail for purposes of explanation.

Heat exchangers of various types, such as steam boilers, condensers, coolers, etc., commonly include tubes having their ends passed through openings in sheets and held in place by being expanded. Such expansion of the tubes is effected by means of a rotary tool adapted to be inserted into the end of a tube extending through a sheet and having rollers engaging the inner surface of the tube. The rollers are of such arrangement that, as the tool is rotated, it gradually moves farther into the tube and the rollers apply increasing pressure tending to expand the tube. As the rolling action continues, the tube wall is rolled thinner in the plane of the sheet and expands outwardly beyond the edge of the opening at both sides of the sheet. When the expansion of the tube by rolling is properly carried out, the tube is mounted in the sheet with a leak-proof joint but, if the expansion of the tube is not sufficient, the joint may leak and, if the expansion is carried too far, the tube will be weakened and is liable to fail at the joint. It is, therefore, important that the expansion of tubes as described be controlled as to the torque applied and be carried on at a torque selected in accordance with the wall thickness of the tube being expanded so that the expansion will be adequate to produce a leak-proof joint without weakening the tubing.

The present invention is directed to the provision of a novel torque control for transmitting a maximum torque selected within a wide range, in which the highest torque setting of the control may be as much as fifty times the lowest setting. The new device depends for its operation upon the use of a reaction member, which is movable angularly against the resistance of a spring by force applied to the member in the transmission of torque by the device. One form of the control includes planetary gearing, the idler pinions of which are mounted on the output spindle of the device and are adapted to be rotated by the prime mover. The internal gear of the planetary system, with which the idler pinions mesh, may be connected to the reaction member by a latch and, so long as the connection between the reaction member and the internal gear is maintained, the rotation of the pinions causes rotation of the spindle. As the torque increases, the reaction member is moved angularly against the action of the spring and, as the maximum torque to be transmitted is exceeded, the accompanying movement of the reaction member causes release of the latch, whereupon the internal gear is free to be rotated by the prime mover without driving the spindle. Upon disconnection of the reaction member, it is returned to its initial position by the spring.

For a better understanding of the invention, reference may be made to the accompanying drawings in which.

Figures 1, 2, 3:
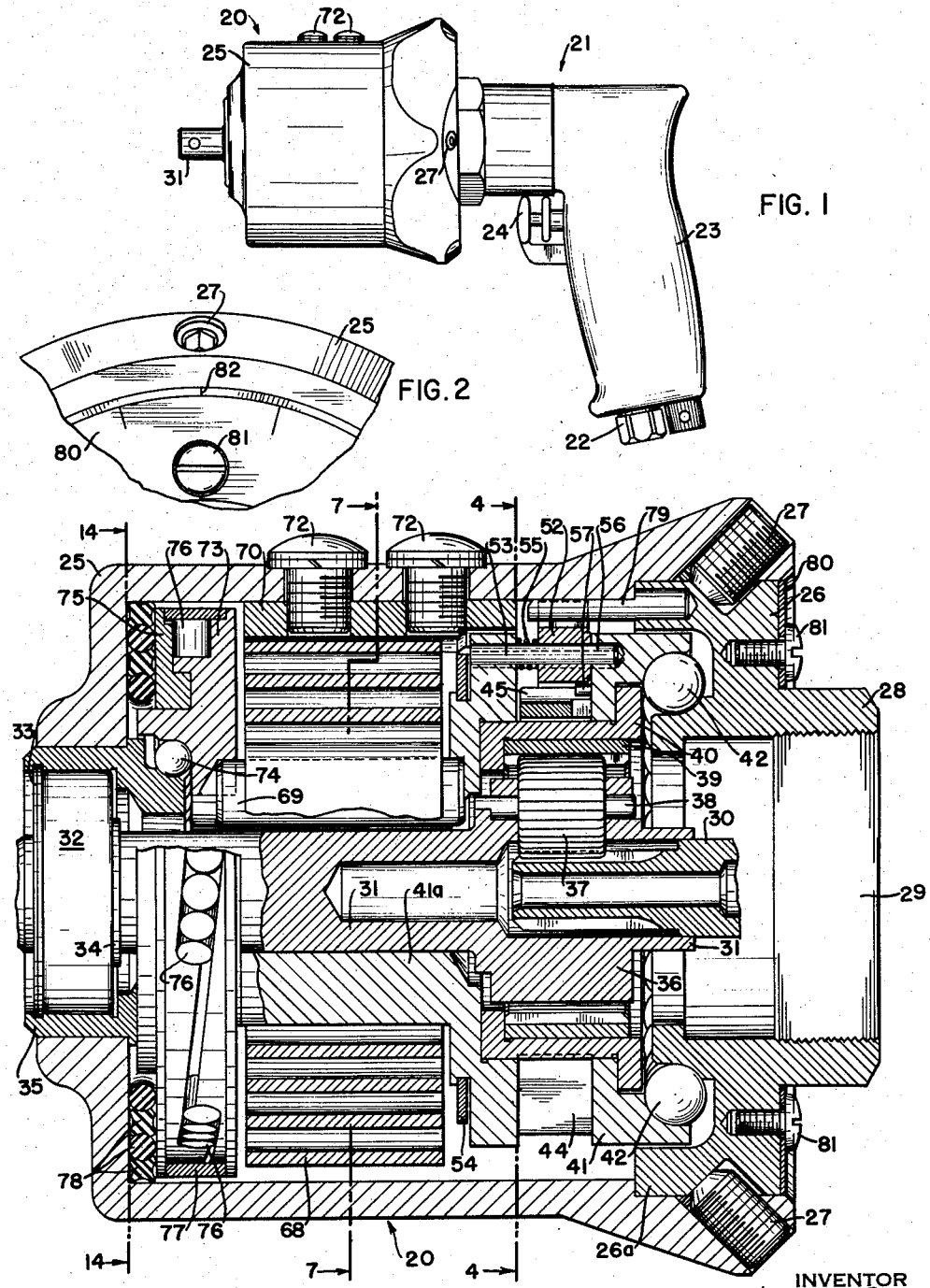
Fig. 1 is a view in side elevation of the new torque control assembled with an air motor having a handle.
Fig. 2 is a fragmentary view of the control in end elevation showing the index plate.
Fig. 3 is a vertical sectional view through the control on the line 3—3 of Fig. 7.
Figure 6:
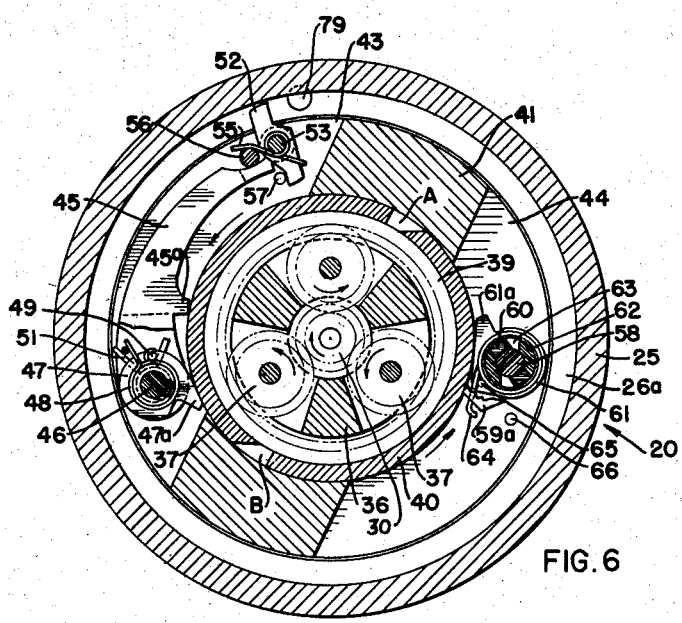
Figure 7:
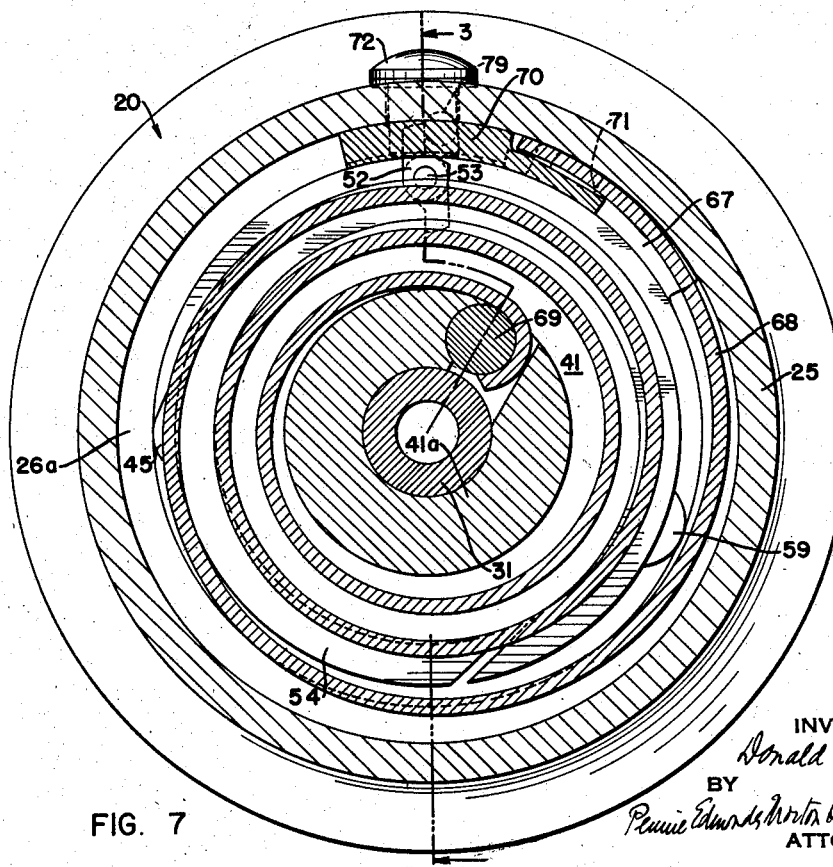
Figure 14:
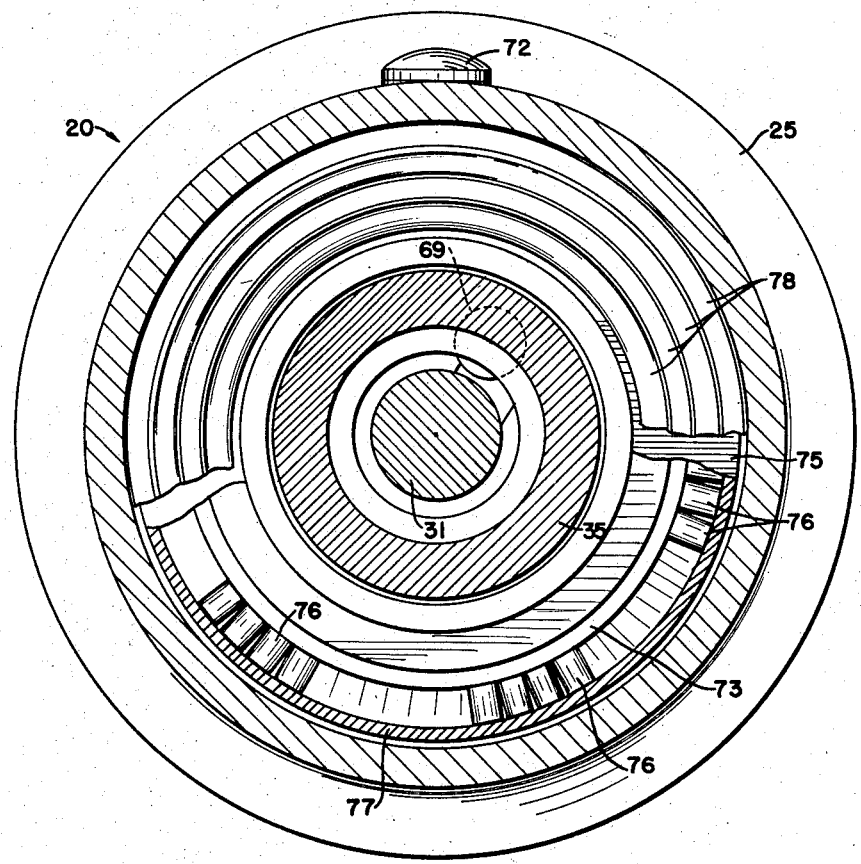

Figs. 4, 5, and 6 are sectional views on the line 4—4 of Fig. 3, showing the parts in their positions at different stages of operation;

Fig. 7 is a sectional view on the line 7—7 of Fig. 3;

Figs. 8 and 9 are sectional views on the lines 8—8 and 9—9, respectively, of Fig. 4;

Fig. 10 is a fragmentary view of the latch, with a part broken away to show the latch return pawl;

Fig. 11 is a view in elevation of the parts shown in Fig. 10;

Fig. 12 is a view in end elevation on an enlarged scale of the tongued and grooved reverse pawls with parts shown in section;

Fig. 13 is a view in end elevation of the pawls shown in Fig. 12;

Fig. 14 is a sectional view on the line 14—14 of Fig. 3 with parts broken away;

Fig. 15 is an exploded perspective view of the major parts of the device with the housing removed;

Fig. 16 is an exploded perspective view of the latch return pawl with parts broken away; and Fig. 17 is an exploded perspective view of the tongued and grooved reverse pawls with parts broken away.

In the drawings, the new torque control 20 is shown attached to an air motor and handle assembly 21. Air under a pressure of, for example, 90 lbs. per sq. in., is supplied to the motor through an inlet 22 at one end of the handle 23 and the operation of the motor is controlled by a trigger 24 actuating an air valve.

The control comprises a housing 25 closed at one end by a plate 26 having an outer circular flange 26a entering the housing, the plate being held in position by a plurality of set screws 27 threaded into openings in the wall of the housing at its open end and entering a peripheral groove in flange 26a. The control illustrated is to be driven by the air motor through a speed reduction device and plate 26 is formed with a central opening surrounded by an internally threaded flange 28 providing a chamber 29 for the device. The output shaft 30 of the device which serves as the drive shaft for the control, has a splined end, which extends through the central opening of plate 26 and enters an axial bore in the end of the output spindle 31 of the control.

The spindle 31 extends from the chamber 29 through the housing 25 to project out of the end of the latter. The front end of the spindle is supported in a bearing 32 and held in place by retainer rings 33, 34 in a bearing housing 35, which is mounted in an opening through the front end of housing 25. At its rear end, the spindle has an enlargement 36 with radial openings, in which pinions 37 are rotatably mounted on pins 38, the pinions meshing with the splined end of shaft 30. The device includes three pinions spaced 120° apart and the pinions are encircled by and mesh with an internal gear 39 mounted with a tight fit in a housing 40. In operation, the gear 39 and housing 40 act as if they were integral.

A reaction member 41 encloses the housing 40 and is formed at its rear end with an internal race for a series of balls 42, which also run in a race formed on a part of flange 28 on the closure plate 26. Adjacent the housing 40, the reaction member is cut away to provide radial recesses 43, 44 and a latch 45 is pivotally mounted in recess 43 on a pin 46 mounted in the member to span the recess. The latch 45 has a lug 45a, which projects from its inner surface and is receivable in either of the like recesses A, B in the outer surface of the internal gear housing 40. The recesses A, B are diametrically disposed and each has a radial wall and an inclined wall lying at an angle to a radius. When the lug 45a is in one of the recesses A, B, the latch holds the gear, gear housing, and reaction member so that they move in unison in one angular direction.

The end of the latch 45 mounted on pin 46 is slotted and a latch return pawl 47 is mounted on the pin within the slot. The pawl has a lug 47a receivable in recesses A, B of the housing 40 and is urged to swing clockwise as seen in Figs. 4 and 10 by a spring 48 bearing at one end against a pin 49 on the pawl and at the other against a fixed pin 50 mounted in the walls of the slot adjacent pin 46. Pin 46 is also encircled by a latch spring 51, which has one end bearing against pin 49 and the other against pin 50. The springs tend to move the latch return pawl 47 in opposite directions and spring 51 is substantially stronger than spring 48.

A latch release pawl 52 is mounted in recess 43 on a pin 53 spanning the recess and held in place by a retainer ring 54. Pin 53 is encircled by a spring 55, one end of which bears against a fixed pin 56 in the wall of recess 43, while the other bears against one edge of pawl 52. The spring normally holds the pawl with one end overlying the end of latch 45 and against a short stop pin 57 mounted in one wall of the recess, while the other end of the pawl projects out of recess 43. When the latch release pawl is in the position stated, it holds the latch with its lug 45a in recess A in the internal gear housing 40.

A pair of reverse pawls are mounted on pin 58 in recess 44 and one of the pawls 59 is formed with a projecting lug 59a and a pair of diametrically disposed tongues 60 extending lengthwise of the pin. The other pawl 61 has a projecting lug 61a and is provided with a hub 62 having a pair of diametrically disposed angular grooves 63 adapted to receive the tongues 60 on pawl 59. A spring 64 encircles the tongues and hubs and has one end entering a bore 59b in pawl 59. The other end of the spring is engageable with a pin 65 on pawl 61 and also with a pin 66 on the wall of recess 44.

The reaction member 41 is provided with an angular lug 67 between and offset from the recesses 43, 44 and, beyond the front face of the lug, the member has a section 41a of reduced diameter. Section 41a is encircled by a flat coil spring 68 and has an opening containing a pin 69, about which the inner end of the spring is anchored. The outer end of the spring overlies a thin section of a combined anchor and stop plate 70 and is secured thereto by lugs 71 on the plate entering openings in the spring. The plate is held in place in housing 25 by a pair of screws 72 threaded through openings in the housing and into the plate. The plate 70 projects laterally beyond the end of the spring and the projecting portion overlies the outer surface of the reaction member in position to be engaged by lug 67 without intercepting the exposed end of the latch release pawl 52.

The spring pin 69 projects beyond the end of the spring and enters a recess in an annular cam plate 73, which is mounted for angular movement on a set of balls 74 lying between races formed in opposed surfaces of the plate and of the front bearing housing 35. One radial face of cam member 73 is channeled to receive a circular rib on an annular brake shoe 75 and the cam plate and brake shoe have cooperating end surfaces of spiral form providing recesses for groups of rollers 76 held in place by a retainer sleeve 77. A group of concentric rubber rings 78 are mounted between the front end face of a brake shoe 75 and the adjacent end of the housing 25 and, in the control illustrated, the group includes two O-rings and two quad rings arranged in alternation.

The plate 26 carries a trip pin 79 extending parallel to the spindle 31 and overhanging the reaction member to lie in the path of the projecting end of the latch release pawl 52. The part of the pin projecting from plate 26 is cut away to form a curved surface, which lies in contact with the inner surface of housing 25. A circular dial plate 80 is mounted on plate 26 by screws 81 to encircle flange 28 and the housing 25 carries an index mark 82 adjacent the outer edge of dial plate 80. By backing out the set screws 27, the plate 26 can be rotated and the angular position of the trip pin with reference to spindle 31 can be determined by reading the scale on the dial plate by means of the index mark.

In the operation of the new torque control for driving a tube expander, for example, the maximum torque to be transmitted is determined by angularly moving plate 26 to place the trip pin 79 in the proper setting, as indicated by the index mark 82 and the scale on dial plate 80. At the start of operation, the latch 45 lies with its lug 45a within recess A in the internal gear housing 40 and it is held in this position by the latch release pawl 52, which lies with its inner end against stop pin 57 and overhanging the free end of the latch. At this time, the latch return pawl 47 is being held with its lug 47a against the surface of housing 40 by the action of spring 51 and the tongued reverse pawl 59 lies with its lug 59a in recess B in housing 40, while the grooved reverse pawl 61 is disposed with its lug 61a lying against the outer surface of housing 40. When the motor is started, it causes rotation of the output shaft 30 of the speed reduction device in a counterclockwise direction as seen in Fig. 4 and the rotation of the shaft causes pinions 37 to rotate clockwise. The pinions meshing with the internal gear 39 tend to move that gear clockwise, but such movement is resisted by engagement of lug 45a against the radial surface of recess A in housing 40. When the motor is operating with the tube expander performing no work, the reaction of the pinions upon the internal gear is insufficient to cause any substantial movement of the internal gear housing and the reaction member against the resistance of spring 68, and the output spindle 31 is rotated counterclockwise as the pinions roll along the internal gear.

When the tube expander is inserted into a tube and begins to perform its expanding function, the torque transmitted to the expander increases and the reaction of the pinions 37 upon the internal gear 39 increases. As a result, the internal gear and its housing 40 move clockwise (Fig. 4) and the reaction member is moved with the gear and housing against the resistance of the main spring 68. The movement in unison of the gear, housing, and reaction member continues until the torque transmitted increases to the selected maximum and the outer end of the release pawl 52 strikes the trip pin 79. Any slight additional torque transmitted causes the gear, housing, and reaction member to move, while the outer end of the release pawl is held by the pin. As a result, pawl 52 is rocked and its inner end moves away from the free end of latch 45. As soon as the latch is thus released, it is swung away from housing 40 by force applied to lug 45a by the radial surface of recess A in the housing and the swinging movement continues until the latch comes to rest with its free end engaging pin 56 and lug 45a free of recess A. With the internal housing 40 disconnected from the latch, the reaction of pinions 37 on the internal gear 39 causes the gear and its housing to move clockwise (Fig. 4), while the pinions rotate on their pins 38 but do not revolve about the axis of the spindle 31. Accordingly, the spindle comes to rest with no further torque applied to the tube expander.

As soon as the latch 45 has been swung to release the reaction member 41 from the internal gear housing, the member is moved counterclockwise (Fig. 5) as the spring 68 unwinds. During this movement of the reaction member, the internal gear 39 and its housing 40 are being rotated clockwise by the action of pinions 37, and the recess B moves beyond the reverse pawls, swinging pawl 59 to free its lug 59a from the recess. As the recess B moves beneath lug 47a of the latch return pawl, the spring 51 causes lug 47a on the pawl to swing and enter the recess and, as the movement of the housing 40 carries the recess past the pawl, the pawl is swung still further by engagement of the trailing wall of the recess with the pawl. In the final position of the pawl, the pin 49 lies beyond the pin 50, so that the ends of spring 51 engage pin 50 on opposite sides and the spring can cause no further swinging of the pawl. However, spring 48 can swing the pawl until pin 49 strikes one end of spring 51 and this movement of the pawl is sufficient to cause its lug to enter one of the recesses A, B, when the recess is opposite the lug. As spring 48 is light, the repeated engagement of lug 47a with the walls of the recesses does no damage.

The clockwise movement (Fig. 5) of the internal gear housing 40 brings the recess A opposite the lug 61a on the grooved reverse pawl 61 and the lug is forced into recess A by spring 64 acting to swing the pawl. As the recess passes by the pawl, the lug 61a is forced out of the recess but held against the surface of the housing 40 by the action of the spring. If the motor is allowed to run, so that housing 40 continues to rotate, lug 61a on the grooved reverse pawl will enter each of the recesses A, B on the housing as they come opposite the lug 61a. However, as spring 65 is light, the walls of the recesses are not injured by their repeated contacts with lug 61a.

When the lug 45a on latch 45 is freed from recess A in the internal gear housing 40 and the reaction member 41 begins to move counterclockwise (Fig. 5) as spring 68 is unwound, the movement of the reaction member carries cam plate 73 with it. In such movement of the cam, its spiral surfaces act through rollers 76 to move the brake shoe 75 endwise, while the shoe is being rotated with the cam plate. Such endwise movement of the brake shoe causes the rings 78 to be squeezed against the end surface of housing 25 and the friction generated causes the reaction member to be moved back slowly until its lug 67 comes into engagement with the spring anchor and stop plate 70.

When the maximum torque, for which the control has been set, has been exceeded and the events above described have taken place, the control is restored to its original operative condition by reversal of the air motor. In such rotation of the motor, it drives shaft 30 clockwise (Fig. 6) and the gears 37 are caused to rotate counterclockwise. As the internal gear 39 and housing 40 are not restricted, the rotation of the gears causes the internal gear and the housing to rotate counterclockwise. When one of the recesses, such as recess B (Fig. 6), reaches lug 47a on the latch return pawl 47, the pawl will be swung by the action of spring 48, so that lug 47a will enter the recess. As the recess moves past pin 46, the lug 47a will be carried with it until, as the recess leaves the lug, the latter will bear against the surface of housing 40, as shown in Fig. 6. As the pawl 47 is swung to final position with its lug 47a bearing on the surface of housing 40, the spring 51 acts to urge latch 45 toward the housing, and, when recess A reaches lug 45a, the latch is swung to cause the lug to enter the recess.

During the movement of housing 40 to carry recess B past pawl 47, as above described, the recess A has moved past the reverse pawls and lug 61a on the grooved recess pawl has entered the recess and the pawl has been swung, so that, as the recess leaves the pawl, lug 61a bears against the outer surface of housing 40 (Fig. 6). In this movement of pawl 61, pawl 59 has been moved to a position with the end of its lug 59 bearing against the outer surface of housing 40 and, when the recess B reaches the reverse pawls, lug 59a on pawl 59 enters the recess. The end of the lug is formed at such an angle that, when the end lies against the sloping surface of the recess, the housing is prevented from moving counterclockwise relative to the reaction member and, since the reaction member lies with its lug 67 against the stop 70, the engagement of lug 59a with the wall of the recess B arrests the internal housing 40. Thereafter the continued rotation of pinions 37 in mesh with the internal gear 39 held stationary causes the drive spindle 31 to rotate in reverse, that is, clockwise as seen in Fig. 4. Since the lug 67 on the reaction member is urged against stop 70 by force applied to the member by the housing 40 through reverse pawl 59 during the reverse rotation of the motor, the member cannot move in a direction to unwind the main spring 68. The control thus does not function to limit maximum torque during reverse rotation but, under such conditions, the torque is ordinarily diminishing and no control is required.

When the motor is stopped after a period of reverse rotation, the pawls are in the positions shown in Fig. 4 and the lug 45a on the latch 45 lies within recess A. The control has thus been restored to its initial condition and is ready for operation to limit the maximum torque transmitted through it, as above described.

In the new control, the construction of the latch pawl 47 and its springs 48, 51 and the formation of the recesses A, B in the internal gear housing 40 insure that, when the latch release pawl 52 is tripped by pin 79, the latch pawl is moved angularly to a position (Fig. 5), in which its light spring 48 holds the latch 45 in inoperative position, in less than a complete turn of the internal gear housing 40. Similarly, upon tripping of the control, the passage of a recess A, B past the reverse pawls causes lug 61a of the grooved pawl 61 to enter the recess in less than a complete turn of the housing. In this position of the grooved pawl, it is ready, upon reversal of the motor and counterclockwise movement (Fig. 4) of the internal gear housing, to enter a recess and swing the tongued pawl 59 into position to enter the following recess and arrest the housing. The reverse pawls thus act in less than one turn of the housing to set the device for reverse drive.

The provision of the stop plate 70 engageable by the lug 67 on the reaction member protects the main spring 68 against injury from excessive unwinding and the brake made up of the shoe plate 75 and the rings 78 protects the device against injury from severe impacts, when the device is tripped. Without some means for limiting the unwinding of the spring, I have found the life of the spring to be relatively short, but, when the spring is prevented from unwinding past its initial position, its life is measured in many thousands of cycles of operation. If no brake were provided, the tripping of the device would cause the lug 67 to strike the stop plate 70 with great force and repeated severe impacts of the lug against the stop would injure the device. The brake causes the reaction member to return slowly to its initial setting and functions properly, even though running in oil. Also, the rubber rings of the brake show little wear after long periods of use.

The new control provides an accurate limitation on the maximum torque transmitted by it and that torque may vary through a wide range as indicated by the following. A control of the invention constructed to transmit a maximum torque of 14 ft. lbs. can be set to trip at ¼ ft. lb. and will trip accurately at that setting as well as a setting of 14 ft. lbs. Accordingly, the range of maximum torque, at which the control will operate, has a maximum to minimum ratio of 56:1.

I claim:

1. A torque control for limiting torque transmitted through the control from a drive shaft, which comprises an output spindle, means operable to transmit the rotation of the shaft to the spindle including an element rotationally movable in either direction by reaction resulting from the application of torque to the transmitting means by the shaft, a reaction member movable angularly in either direction, a stop limiting the movement of the reaction member in one direction, a spring acting on the reaction member and urging it toward the stop, means connecting the reaction member and the element for angular movement in unison, trip means operable to render the connecting means inoperative after a predetermined movement of the reaction member and the element in unison against the action of the spring, and brake means for slowing the return angular movement of the reaction member caused by the spring after the connecting means have become inoperative.

2. The torque control of claim 1, in which the connecting means include a latch pivoted on the reaction member.

3. The torque control of claim 2, in which the latch is held in effective position by a release pawl on the reaction member and the trip means act to put the release pawl out of action.

4. The torque control of claim 3 enclosed within a housing carrying a pin angularly adjustable about the axis of the spindle and acting as the trip means to put the release pawl out of action.

5. The torque control of claim 4, in which the housing has a plate, which is angularly adjustable about the axis of the spindle and carries the pin and a scale, and the housing has an index mark adjacent the scale on the plate.

6. The torque control of claim 1, which includes a second connecting means operable to connect the element and reaction member and hold the element against movement in the direction opposite to that, in which the element and member move in unison.

7. The torque control of claim 6, in which the element has recesses in its outer surface and the second connecting means include a latch pivoted on the reaction member and having a part receivable in the individual recesses in the element.

8. The torque control of claim 7, in which a return pawl is pivoted on the latch and has a part receivable in the individual recesses in the element, and a spring acts on the latch and return pawl and urges them to move in opposite directions about the pin.

9. The torque control of claim 8, in which a pair of springs act on the latch and return pawl and urge the latch and pawl to move in opposite directions about the pin, the springs acting in opposition to each other and being of unequal strength.

10. The torque control of claim 6, in which a pair of reverse pawls are pivoted on the same pin on the reaction member, the pawls have parts receivable in the individual recesses in the element, and the part on one of the reverse pawls is operable, when in a recess, to prevent angular movement of the element in one direction.

11. The torque control of claim 10, in which one pawl is operated by engagement of its part with the walls of the recesses during angular movement of the element in one direction to hold the second pawl out of action and is similarly operated during angular movement of the element in the other direction to move the second pawl to cause its part to enter a recess and prevent further angular movement of the element in that direction.

12. The torque control of claim 1, in which the means for driving the spindle include pinions mounted for rotation on the spindle and the element includes an internal gear encircling and meshing with the pinions.

13. The torque control of claim 1, in which the spring encircles and is secured at its inner end to a part of the reaction member.

14. The torque control of claim 13 enclosed within a housing and having a stop within and secured to the housing and limiting the movement of the reaction member in one direction, the outer end of the spring being anchored to the stop.

15. The torque control of claim 1 enclosed within a housing having a fixed brake surface, the brake means including a brake shoe, friction material between the shoe and surface, and cam means rotated by the reaction member and rotating the brake shoe, the cam means also acting during rotation in one direction to move the shoe toward the surface to compress the friction material between the shoe and surface.

16. The torque control of claim 15, in which the friction material is rubber rings.

17. The torque control of claim 15, in which the brake shoe is a plate having one face engageable with the friction material and its other face having spiral grooves and the cam means include a plate having a face opposed to the grooved face of the shoe and formed with corresponding and opposed grooves, and a plurality of rolling elements lying in the opposed grooves of the shoe and plate.

References Cited in the file of this patent

UNITED STATES PATENTS

| | | |
|---|---|---|
| 424,418 | Hitt | Mar. 25, 1890 |
| 1,815,345 | Coleman | July 21, 1931 |
| 2,046,283 | Berlyn | June 30, 1936 |
| 2,142,757 | Nardone | Jan. 3, 1939 |
| 2,593,933 | Strawn | Apr. 22, 1952 |